(12) United States Patent
Quandt

(10) Patent No.: US 6,676,176 B1
(45) Date of Patent: Jan. 13, 2004

(54) ENCLOSURE FOR INDUSTRIAL CONTROLS

(75) Inventor: Robert H. Quandt, Aurora, IL (US)

(73) Assignee: Siemens Energy & Automation, Alpharetta, GA (US)

( * ) Notice: Subject to any disclaimer, the term of this patent is extended or adjusted under 35 U.S.C. 154(b) by 165 days.

(21) Appl. No.: 09/676,873

(22) Filed: Sep. 29, 2000

(51) Int. Cl.[7] .............................................. E05C 3/04
(52) U.S. Cl. ..................................... 292/202; 411/553
(58) Field of Search ............................... 411/552, 553; 403/405.1; 24/453; 292/202

(56) References Cited

U.S. PATENT DOCUMENTS

| | | | | | |
|---|---|---|---|---|---|
| 2,424,757 A | * | 7/1947 | Klumpp | ..................... | 174/153 |
| 3,079,581 A | * | 2/1963 | Klumpp | ..................... | 339/128 |
| 3,562,847 A | * | 2/1971 | Jemison | ..................... | 16/2 |
| 3,856,247 A | * | 12/1974 | Keighley | ..................... | 248/154 |
| 3,958,308 A | * | 5/1976 | Gooding | ..................... | 24/221 |
| 3,988,808 A | * | 11/1976 | Poe | ..................... | 24/73 |
| 4,033,535 A | * | 7/1977 | Moran | ..................... | 248/56 |
| 4,128,923 A | * | 12/1978 | Bisbing | ..................... | 24/221 R |
| 4,381,656 A | * | 5/1983 | Hayakawa | ..................... | 70/451 |
| 4,431,355 A | * | 2/1984 | Junemann | ..................... | 411/360 |
| 4,527,822 A | * | 7/1985 | Kopich | ..................... | 292/257 |
| 4,801,232 A | * | 1/1989 | Hempel | ..................... | 411/552 |
| 4,892,979 A | * | 1/1990 | Rossow | ..................... | 174/153 |
| 4,913,385 A | * | 4/1990 | Law | ..................... | 248/56 |
| 5,123,795 A | * | 6/1992 | Engel | ..................... | 411/552 |
| 5,251,467 A | * | 10/1993 | Anderson | ..................... | 70/370 |
| 5,382,124 A | * | 1/1995 | Frattarola | ..................... | 411/352 |
| 5,421,541 A | * | 6/1995 | Condon | ..................... | 248/56 |
| 6,447,166 B1 | * | 9/2002 | Ray | ..................... | 384/10 |

* cited by examiner

Primary Examiner—Gary Estremsky

(57) ABSTRACT

Performance and aesthetic attractiveness of industrial enclosures of the type used to house electrical and hydraulic equipment are enhanced through use of an improved quick-release fastener for attaching removable access panels of such enclosures. The improved fastener includes a split bushing with integral retaining tangs configured for retaining the quick-release fastener in access panels having different thicknesses.

20 Claims, 2 Drawing Sheets

ENCLOSURE FOR INDUSTRIAL CONTROLS

FIELD OF THE INVENTION

This invention relates to enclosures of the type used in industrial electrical and hydraulic systems and the like, and more particularly to an improved fastener for attaching removable access panels in such enclosures.

BACKGROUND OF THE INVENTION

Control components, wiring, and plumbing in industrial electrical and hydraulic control systems are often mounted in cabinet-like enclosures. Such enclosures typically include a frame having a flange for attachment of one or more removable access panels. Each access panel typically includes a number of quick-release fasteners installed through holes in the panel for attaching the panel to the flange.

Such quick-release fasteners typically include a retaining screw having a shaft section defining an axis. One end of the retaining screw is formed into a head having a larger outer diameter than the shaft of the screw, and including a slot, recess, flats, or knurling so that the screw may be installed and removed by hand or with common hand tools. The opposite panel retaining end of the screw is typically formed to provide male or female screw threads, an L-shaped form, or some other type of quick-attach retainer profile, cooperating with the flange or a mating thread, etc., attached to the flange for securing the access panel to the frame of the enclosure.

The fastener also typically includes a bushing having an outer profile which includes a first section shaped for insertion through a hole in the panel, a shoulder for positioning the bushing in the panel, and a bore extending through the bushing about the axis to receive the shaft with the head of the retaining screw adjacent the shoulder on the outside of the panel, and the opposite panel retaining end on the inside of the panel. The bushing is typically secured within the hole by a C-ring which snaps into a groove of the bushing inside of the panel after the bushing is inserted through the hole. It is common in such fasteners to have the head and panel retaining inner end of the retaining screw larger in diameter than the bore of the bushing, or otherwise configured such that the screw is held captive within the bushing.

In some fasteners, a spring is also provided between the head of the screw and the shoulder of the bushing to facilitate installation and removal of the panel by pulling the panel retaining end of the screw away from the flange after disengagement.

Inherent problems associated with the manufacture and use of prior art quick-release fasteners of the type described above increase the initial and life cycle cost of the fasteners and enclosures in which they are used. Performance and aesthetic desirability of the enclosures is also reduced by the inherent problems associated with the use of the prior art fasteners.

Using C-rings for retaining the fastener in the access panel creates several problems. The initial labor and part cost is increased by the need to stock, handle, and install the separate C-ring. The risk of dropping a C-ring into the enclosure during installation, operation, or maintenance activities is undesirable. There is also an aesthetic problem, in that unless the C-rings clamp the bushing of the fastener tightly against both faces of the panel, the fasteners may rattle when the panel is removed, giving a customer the impression of sloppy workmanship and shoddy design. To alleviate this problem, the bushings can be closely matched to a given panel thickness, but where several different panel thicknesses are used by a manufacturer, perhaps even on the same enclosure, this requires a different fastener configuration for each panel thickness.

Prior quick-release fasteners of the type described above having a head and panel retaining end configured to be larger in diameter or otherwise shaped so as to not slide through the bore of the bushing of the completed fastener are difficult to manufacture. Because neither the head nor panel retaining end of the retaining screw will fit through the bushing, the bushing must be installed on the shaft section of the retaining screw during manufacture prior to forming the head or forming the panel retaining end of the retaining screw. Where the fastener must ultimately be plated, or where a spring is utilized between the head and shoulder of the bushing, the necessity of installing the bushing midway through formation of the screw is highly undesirable.

It is an object of my invention, therefore, to provide an improved enclosure through the use of an improved quick-release fastener for access panels of the enclosure. Other objects of my invention include providing:

(1) a fastener that is more readily manufactured than prior fasteners at a lower cost;

(2) a fastener that is self-retaining;

(3) a fastener that is self-retaining in panels of several different thicknesses;

(4) a fastener in which the component parts can be separately manufactured and subsequently assembled following completion of all manufacturing operations on the various component parts;

(5) a bushing which can be installed on the shaft section of a retaining screw of a fastener following completion of all manufacturing steps for the retaining screw; and (6) a fastener which can be retrofitted into existing panel and enclosure designs to improve their desirability.

SUMMARY OF THE INVENTION

My invention provides such an improved enclosure and solves the problems defined above through the use of an improved quick-release fastener. According to one aspect of the invention, the improved quick-release fastener includes a bushing having an outer profile including a first section shaped for insertion through a hole in an access panel of an enclosure, a shoulder and a resilient tang axially spaced from the shoulder for retaining the bushing in the panel, and a bore extending through the bushing about an axis for receiving a shaft section of a retaining screw of the quick-release fastener. In preferred embodiments of this aspect of my invention, the tang includes a serrated surface configured to bear against an inner surface of the access panel, with the serrations having notches shaped for receipt of the inner surface of panels of several thicknesses. According to another aspect of my invention, the improved quick-release fastener utilizes a bushing comprised of two segments separable along a plane passing through the axis of the bore of the bushing. In preferred embodiments, the two segments include corresponding male and female alignment formations for aligning the bushing about the bore. In a highly preferred embodiment, the two segments of the bushing are identical.

Other aspects and advantages of my invention will be apparent from a review of the following drawings and detailed description of exemplary embodiments.

DETAILED DESCRIPTION OF THE PREFERRED EMBODIMENT

Figure 1:
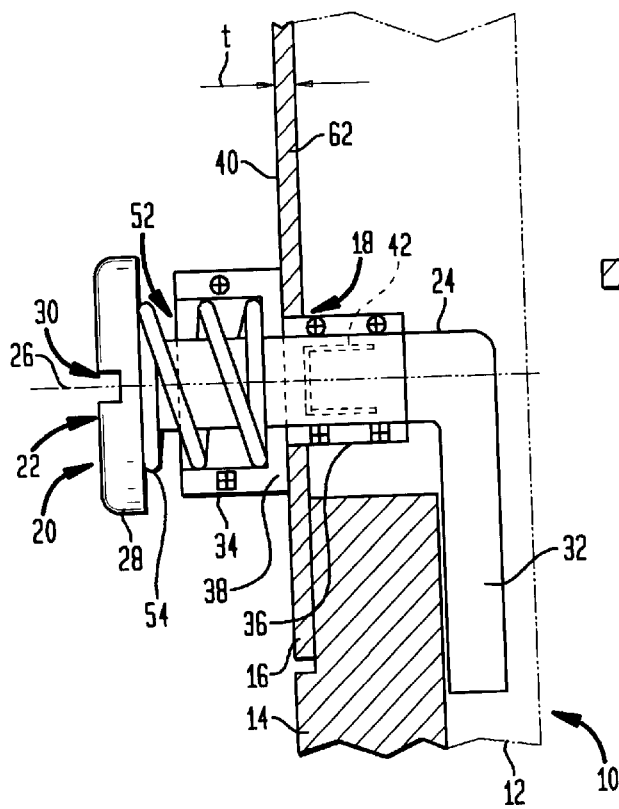
FIG. 1 is an exemplary embodiment of an enclosure according to my invention.

FIG. 1 shows an exemplary embodiment of an enclosure 10 according to my invention. The enclosure 10 includes a frame 12 having a flange 14 for attachment of a removable panel 16. The panel 16 includes a hole 18, and a quick-release fastener 20 retained in the hole 18, as described in detail below, for attaching the panel 16 to the flange 14 of the enclosure 10.

The fastener 20 includes a retaining screw 22 having a shaft section 24 defining an axis 26. The retaining screw 22 includes a head 28 at an outer axial end of the shaft 24, and an L-shaped opposite inner axial panel retaining end 32 of the shaft section 24 for engaging the flange 14. The shaft section 24 is located intermediate the head 28 and the latch 32. The head 28 of the retaining screw 22 includes a slot 30 for receipt of a screwdriver or other such tool for turning the retaining screw 22. Although FIG. 1 illustrates a slot 30 for receipt of a standard flat-bladed screwdriver, the head 28 of the screw 22 could also be configured to be compatible with other types of installation tools such as Phillips screwdrivers, hex head Allen wrenches, mechanic's wrenches, or even knurled for providing an enhanced finger grip or configured like a thumb screw such that the screw could be turned without the need for a tool.

Figure 2:
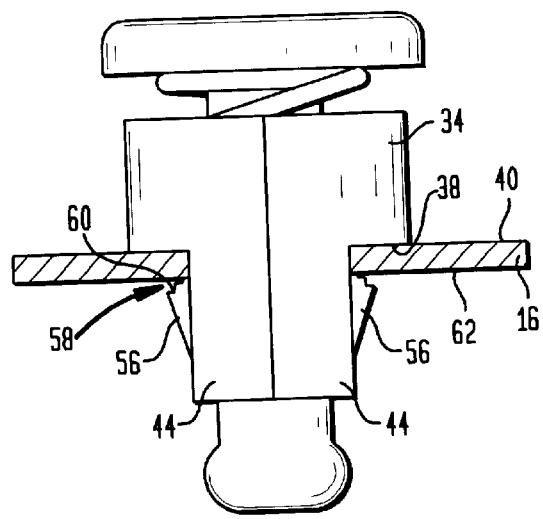
FIGS. 2 and 3 illustrate detailed features of the embodiment of FIG. 1.
Figure 3:
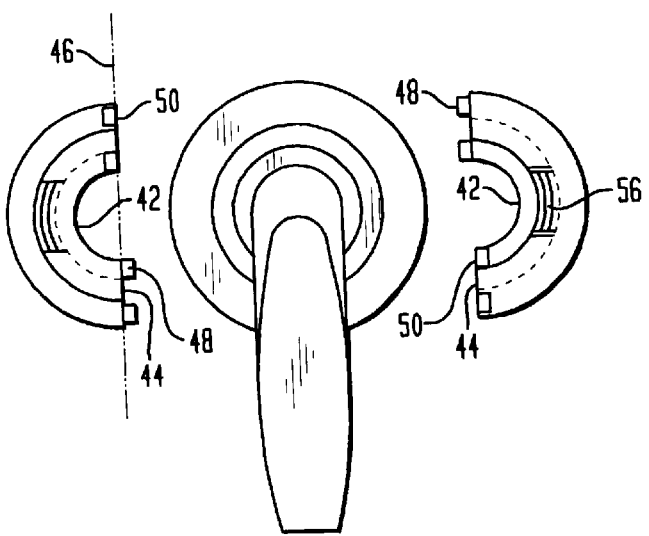

As shown in FIGS. 1–3, the fastener 20 further includes a bushing 34 having an outer profile including a first section 36 shaped for insertion through the hole 18 in the panel 16. The bushing 34 includes a shoulder 38 bearing against a first or outer surface 40 of the panel 16 for positioning the bushing 34 in the hole 18 of the panel 16. The bushing includes a bore 42 extending through the bushing 34 about the axis 26 for receiving the shaft section 24 of the screw 22, with the head 28 of the screw 22 adjacent the shoulder 38.

The bushing 34 includes two identical bushing segments 44 separable along a plane 46 passing through the axis 26 of the bore 42. The bushing segments 44 include corresponding male and female alignment formations in the form of projections and recesses 48,50 for aligning the bushing 34 about the bore 42. The bushing 34 further includes a recess 52 centered on the axis 26 and opening toward the head 28 for receipt of a spring 54 extending from the shoulder 38 toward the head 28 of the screw, for biasing the shaft section 24 of the retaining screw along the axis 26 of the bore 42 in a direction away from the shoulder 38.

The bushing 34 further includes a pair of resilient tangs 56, one in each bushing segment 44. The tangs 56 are axially spaced from the shoulder 38 of the bushing and configured to be resiliently displaced radially inward as the bushing 34 is inserted into the hole 18 of the panel. The tangs 56 include serrations 58 having a plurality of notches 60 shaped for receipt of a second face 62 of the panel 16. The notches 60 in the serrations 58 of the tangs 56 are shaped such that the bushing 34 can be utilized in panels having several different thicknesses t, with the notches being axially spaced from the shoulder 38 and configured such that for each incremental thickness t, a notch is available for gripping the second or inside face 62 of the panel 16.

Those having skill in the art will recognize that through use of the split bushing 34 with integral tangs 56 configured to accommodate a number of different panel thicknesses t, my invention provides solutions to the problems detailed above and a number of advantages when used in the manufacture and operation of the type of enclosures described herein. Having the bushing 34 be separable, allows all pieces of the quick-release fastener 20 to be manufactured independent of each other, and brought together only at the assembly stage, thereby eliminating the manufacturing problems inherent in prior quick-release fasteners. The corresponding male and female alignment formations 48,50 facilitate assembly and installation. Forming the bushing 34 of two identical segments 44, reduces manufacturing and inventory costs. The tangs 56 eliminate the need for the separate C-rings utilized in prior quick-release fasteners, thereby reducing both initial assembly and operating cost, and reducing the risk of a C-ring being dropped into the enclosure. The serrations 58 and notches 60 in the tangs 56, and the overall configuration of the tangs 56 which allows the fastener 20 to be quickly inserted by simply pushing it into the hole 18 in the panel 16, and to be held fast there in panels of varying thickness to reduce rattling, provides advantages reducing the cost and improving the aesthetic desirability of the enclosure.

Figure 4:
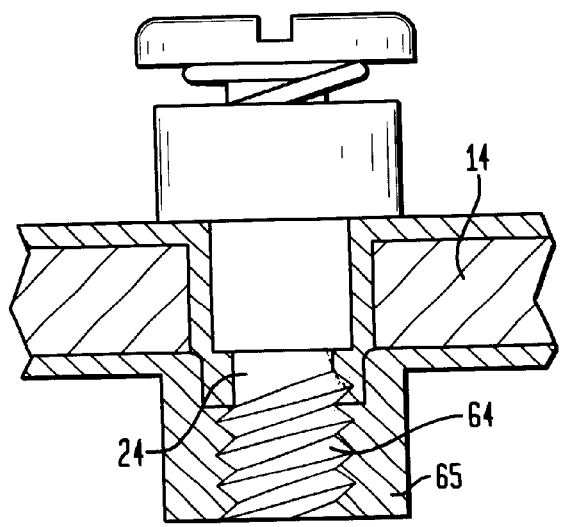
FIGS. 4–6 illustrate alternate embodiments of possible panel retaining ends for a retaining screw in a quick-release fastener according to my invention.
Figure 5:
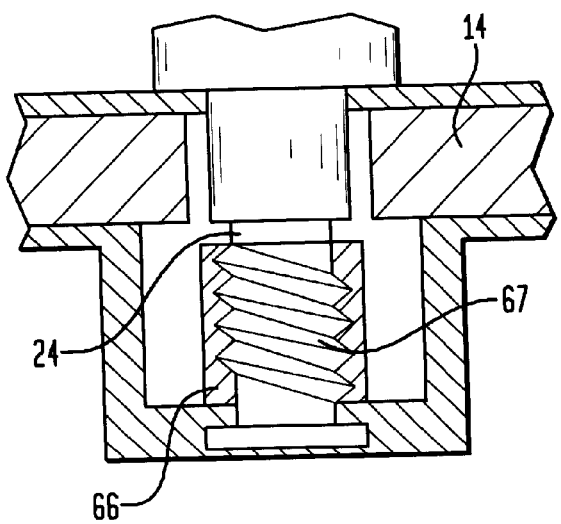
Figure 6:
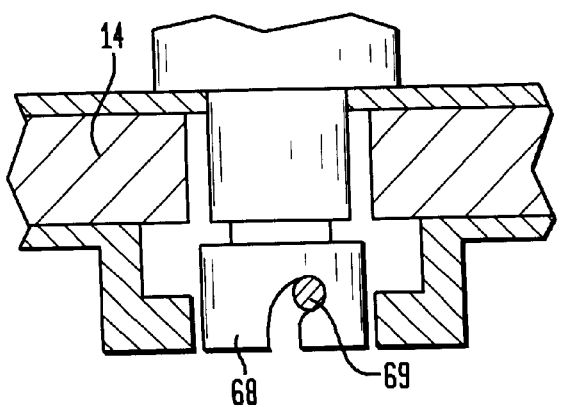

Although I have described my invention in terms of various exemplary embodiments thereof, those skilled in the art will recognize that there are a number of variations that can be made without departing from the scope of my invention as defined by the appended claims. For instance, as illustrated in FIGS. 4–6, the inner axial panel retaining end 32 of the shaft section 24 of the retaining screw 22 can be formed into a male thread 64, or a female thread 66, or as one part 68 of a quick-attach retainer to mate respectively with a cooperating female thread 65, male thread 67, and second part of a quick-attach retainer attached to the flange 14. It is understood, therefore, that the spirit and scope of the appended claims should not be limited to the specific embodiments described and depicted herein.

What is claimed is:

1. A fastener insertable through a hold in a panel for attaching said panel to a flange, said fastener comprising:

a. a retaining screw having a shaft defining an axis, said screw including a head at an outer axial end of said shaft and an opposite inner axial panel retaining end of said shaft for engaging said flange; and b. a bushing having an outer profile including a first section shaped for insertion through said hole in said panel, a shoulder and a tang axially spaced from said shoulder for retaining said bushing in said panel, and a bore extending through said bushing about said axis for receiving said shaft with the head of the screw adjacent said shoulder, wherein said bushing is comprised of two segments separable along a plane passing through said axis.

2. The fastener of claim 1 wherein said panel retaining end is a screw thread for engaging a mating screw thread affixed to said flange.

3. The fastener of claim 1 wherein said panel retaining end is one part of a quick-attach retainer for engaging a mating part of said quick-attach retainer affixed to said flange.

4. The fastener of claim 1 wherein said panel retaining end is L-shaped for engaging said flange.

5. The fastener of claim 1 wherein said panel has a first and a second face separated by a thickness, and said shoulder and tang are axially spaced a distance substantially equal to said thickness such that when said bushing is inserted in said panel said shoulder and tang bear against said first and second faces respectively of said panel, to thereby retain said bushing in said panel.

6. The fastener of claim 5 wherein said shoulder and tang are configured for retaining said bushing in panels of different thicknesses.

7. The fastener of claim 6 wherein said tang includes a serrated surface for bearing against said second surface of said panel, said serrations having notches shaped for receipt of said second face of panels of different thicknesses.

8. The fastener of claim 1 wherein said tang of said bushing is configured to be resiliently displaced radially inward as said bushing is inserted into said hole and spring radially outward to retain said bushing in said panel.

9. The fastener of claim 1 wherein said segments include corresponding male and female alignment formations for aligning said bushing about said bore.

10. The fastener of claim 9 wherein said segments are identical.

11. The fastener of claim 1 wherein said segments are identical.

12. The fastener of claim 1 wherein said bushing further includes a recess extending from said shoulder for receiving a portion of said shaft.

13. The fastener of claim 1 wherein said bushing further includes a recess extending from said shoulder for receiving a spring biasing said screw along said axis.

14. The fastener of claim 1 further comprising a spring between the head of the screw and said bushing for biasing said screw axially away from said bushing.

15. The fastener of claim 14 wherein said bushing further includes a recess extending from said shoulder for receiving said spring.

16. A fastener insertable through a hole in a panel for attaching said panel to a flange, said fastener comprising:
(a) a retaining screw having a shaft defining an axis, said screw including a head at an outer axial end of said shaft and an opposite inner axial panel retaining end of said shaft for engaging said flange; and
(b) a bushing having an outer profile including a first section shaped for insertion through said hole in said panel, a shoulder for positioning said bushing in said panel, and a bore extending through said bushing about said axis for receiving said shaft with the head of the screw adjacent said shoulder, said bushing comprising two segments separable along a plane passing through said axis.

17. A removable panel for attachment to a flange, said removable panel comprising:
(a) a panel having a hole; and
(b) a fastener in said hole for attaching said panel to said flange, said fastener comprising:
a retaining screw having a shaft defining an axis, said screw including a head at an outer axial end of said shaft and an opposite inner axial panel retaining end of said shaft for engaging said flange;
a bushing having an outer profile including a first section shaped for insertion through said hole in said panel, a shoulder for positioning said bushing in said panel, a bore extending through said bushing about said axis for receiving said shaft with the head of the screw adjacent said shoulder, said bushing comprising two segments separable along a plane passing through said axis.

18. The panel of claim 17 wherein said bushing further includes a tang axially spaced from said shoulder for retaining said fastener in said hole in said panel.

19. An enclosure comprising:
(a) a frame including a flange for attachment of a removable panel; and
(b) a removable panel including a panel having a hole and a fastener in said hole for attaching said panel to said flange, said fastener comprising:
a retaining screw having a shaft defining an axis, said screw including a head at an outer axial end of said shaft and an opposite inner axial panel retaining end of said shaft for engaging said flange;
a bushing having an outer profile including a first section shaped for insertion through said hole in said panel, a shoulder for positioning said bushing in said panel, a bore extending through said bushing about said axis for receiving said shaft with the head of the screw adjacent said shoulder, said bushing comprising two segments separable along a plane passing through said axis.

20. The enclosure of claim 19 wherein said bushing further includes a tang axially spaced from said shoulder for retaining said fastener in said hole in said panel.

* * * * *